Oct. 17, 1961     S. A. SCHWARTZ     3,005,130
FLUORESCENT LIGHTING SYSTEM
Filed Nov. 21, 1958
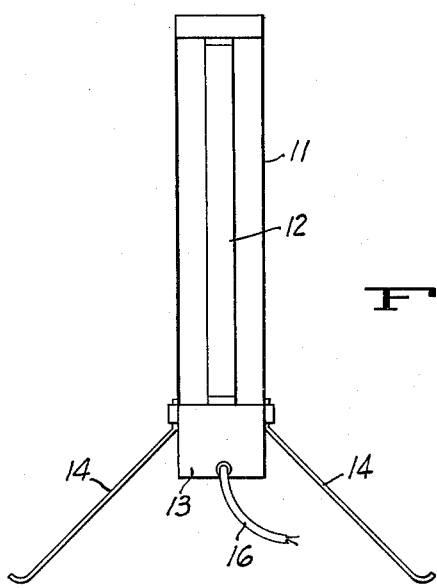
FIG_1_
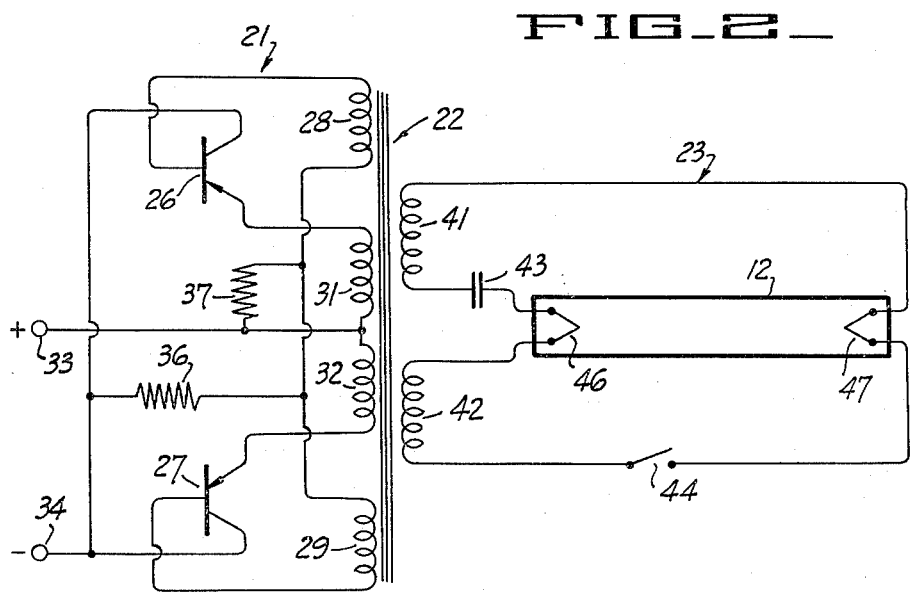
FIG_2_
INVENTOR.
Samuel A. Schwartz
BY
ATTORNEYS

United States Patent Office 3,005,130
Patented Oct. 17, 1961

3,005,130
FLUORESCENT LIGHTING SYSTEM
Samuel A. Schwartz, 324 Langton Ave., Los Altos, Calif.
Filed Nov. 21, 1958, Ser. No. 775,425
6 Claims. (Cl. 315—206)

This invention relates generally to a fluorescent lighting system, and more particularly to a fluorescent lighting system employing an improved power supply.

Inverters have been employed in conjunction with D.-C. power sources such as batteries for supplying power to fluorescent lighting systems. In general, the inverters provide A.-C. power to a conventional fluorescent system which includes ballast, starter and fluorescent lamp. The systems are relatively heavy and not adapted for portable use. Furthermore, systems of this type are relatively expensive to manufacture.

It is a general object of the present invention to provide an improved fluorescent lighting system.

It is another object of the present invention to provide a fluorescent lighting system which can be operated from a relatively low voltage D.-C. power source, such as a battery.

It is another object of the present invention to provide a fluorescent lighting system in which a transformer used in the inverter circuit contains the ballast.

It is still a further object of the present invention to provide a fluorescent lighting system for operation from low voltage D.-C. sources such as batteries in which a transistorized inverter including a built-in ballast serves to supply the power to the fluorescent lighting fixture.

It is a further object of the present invention to provide a relatively inexpensive portable fluorescent lighting system.

These and other objects of the invention will become more clearly apparent from the following description when taken in conjunction with the accompanying drawing.

Referring to the drawing:

FIGURE 1 is an elevational view of a portable fluorescent lighting system in accordance with the present invention; and FIGURE 2 is a detailed circuit diagram of the electrical circuits of the system of FIGURE 1.

Referring to FIGURE 1, a portable fluorescent lighting system in accordance with the present invention is illustrated. The fluorescent tube 12 is supported within a housing 11 which may be a reflector. The lower end 13 of the housing may accommodate the inverter to be presently described in detail. Suitable legs 14 are releasably secured to the lower portion of the housing 11 and serve to hold the lamp erect. A cord 16 may be supplied for connecting the lamp to a suitable power source, for example, a battery. Alternatively, the housing 13 may be enlarged and have a self-contained battery suitable for operating the lamp.

Referring to FIGURE 2, a detailed circuit diagram of the fluorescent lighting system is shown. The system includes a transistorized inverter designated generally by the reference numeral 21. A transformer 22 serves to couple the inverter 21 to the fluorescent lamp circuit designated generally by the reference numeral 23. The inverter 21 serves to convert the input D.-C. power to A.-C. power suitable for energizing the lamp 12. The inverter illustrated is a transistorized inverter including transistors 26 and 27. The bases of the transistors are interconnected through the windings 28 and 29 of the transformer. The emitters are interconnected to the windings 31 and 32 of the transformer. Input D.-C. is applied across the terminals 33 and 34. A starting resistor 36 serves to provide appropriate bias to the bases of the transistors whereby the inverter is self-starting. The resistor 37 serves to limit the current flowing in the base of the transistors when they are conducting.

Briefly, operation of the inverter circuit is as follows: When power is first applied between the terminals 33 and 34, current flows through the resistor 36 to provide a suitable bias voltage between the base and collector of the transistors 26 and 27. Current begins to flow in the emitter to collector path of one of the transistors. As the current begins to rise, it induces a voltage in the associated windings 28 and 29. This tends to rapidly turn on the transistor. When the current through the transistor reaches saturation, the voltage induced in the winding is reduced to zero and the transistor is driven towards cut-off. The bias on the other transistor is such that it is being turned on. Thus, the transistors 26 and 27 act as switches with the base bias controlling the switching of the transistor, and the emitter to collector path serving as the conducting path.

The windings 31 and 32 induce a flux in the transformers which links the windings 28, 29, 41 and 42. In accordace with the present invention, the primary windings 28, 29, 31, 32 and the secondary winding 42 are closely coupled and the winding 41 is loosely coupled. This provides an equivalent inductance in series with the output of the winding 41. The winding 41 is connected to the fluorescent lamp 12 through a coupling capacitor 43. The equivalent inductance in series with the winding 41 functions as the conventional fluorescent lamp ballast. The capacitor 43 is added to correct the power factor of the fundamental component of power through the lamp circuit by forming a series resonant circuit with the leakage inductance in the winding 41 and the resistance of the lamp under operating conditions. The capacitor 43 also serves to reduce the switching time of the transistors 26 and 27 over that which would be obtained with a pure inductive load such as the winding 41 and lamp by themselves. Reducing the switching time reduces transistor dissipation, thus resulting in increased overall efficiency of operation of the circuit and greater reliability.

The second winding 42 is connected in series aiding with the winding 41. Thus, when the starting switch 44 is enclosed, higher than normal operating voltage is applied across the heaters 46 and 47 of the lamp. Since the heaters require approximately 40% more starting current than normal operating current, the winding 42 is used to aid in starting the lamp. As soon as the heaters in the lamp have reached a proper temperature as may be recognized by the fluorescent area at each end of the tube, the switch is opened. When the switch is opened, the field stored in the leakage inductance collapses giving a high voltage pulse to the fluorescent lamp 12 to thereby energize the same.

It is, of course, apparent that an automatic starter of the conventional type may be employed rather than the switch 44. In such event, the starting operation would be automatically performed by the starter switch.

A fluorescent lighting system in accordance with the foregoing was built and tested. The various components were as follows:

Fluorescent lamp was known by manufacturer's specification as Harmony House 14 watt fluorescent lamp.
Transistors 26 and 27 were known my manufacturer's specification as Motorola type 2N555.
Transformer 22 had the following turns:
    Winding 28=67 turns
    Winding 31=54 turns
    Winding 32=54 turns
    Winding 29=67 turns
    Winding 42=136 turns
    Winding 41=340 turns and disposed on a separate leg of a transformer.

Resistors:
  36—1000 ohms, ½ watt
  37—10 ohms, 1 watt
Capacitor 43—1 μf.

A lamp constructed in accordance with the foregoing was connected to a 12 volt automobile battery and operated satisfactorily.

Thus, it is seen that there is provided an improved fluorescent lighting system. The inverter is connected in a transformer circuit such that the secondary winding connected to the fluorescent lamp is loosely coupled to the primary windings whereby the leakage inductance serves to store flux and to supply a high voltage pulse to the fluorescent lamp to trigger the same. The weight of the lighting system is at a minimum since no ballast is required.

I claim:

1. A lighting system of the type adapted to illuminate a fluorescent lamp from a D.-C. power source comprising an inverter, a transformer having first and second primary windings and at least first and second secondary windings, said primary windings being connected in circuit with said inverter and being closely coupled with respect to one another, said first secondary winding being loosely coupled with respect to the primary windings and being connected in circuit with said lamp, said second secondary windings being closely coupled to the primary windings and being connected in series circuit with said first secondary winding, and switching means adapted to selectively connect said second secondary winding in series with said first winding.

2. A fluorescent lighting system of the type adapted to operate from a power source comprising first and second transistors connected in an inverter circuit, a transformer having first and second primary windings and at least a secondary winding, said primary windings being connected in circuit with said transistors and being closely coupled with respect to one another, said secondary winding being loosely coupled to said primary windings and a fluorescent lamp connected in circuit with said secondary winding.

3. A fluorescent lighting system as in claim 2 in which a capacitor is connected in series with said secondary winding.

4. A fluorescent lighting system of the type adapted to operate from a D.-C. power source comprising first and second transistors each having at least emitter, base and collector electrodes, first and second primary windings connected between the emitters of said transistors, third and fourth primary windings connected between the bases of said transistors, means for applying said D.-C. power between said first and second primary windings and the collectors of said transistors, fifth and sixth windings, said fifth winding being loosely coupled to said primary windings, a fluorescent lamp connected in circuit with said fifth winding, said sixth winding being connected in electrical series with said fifth winding, and switch means adapted to selectively connect said sixth winding in circuit with said fifth winding.

5. A fluorescent lighting system as in claim 4 wherein a current limiting resistor is connected between the emitter and base of said transistors and a starting resistor is connected between the base and collector.

6. A fluorescent lighting system as in claim 5 in which a capacitor is connected in series with said fifth winding.

References Cited in the file of this patent
UNITED STATES PATENTS

| | | |
|---|---|---|
| 2,016,790 | Perlman | Oct. 8, 1935 |
| 2,309,711 | Pearson | Feb. 2, 1943 |
| 2,497,534 | Campbell | Feb. 14, 1950 |
| 2,511,939 | Packard | June 20, 1950 |
| 2,829,257 | Root | Apr. 1, 1958 |
| 2,852,730 | Magnuski | Sept. 16, 1958 |
| 2,883,539 | Bruck et al. | Apr. 21, 1959 |
| 2,916,704 | Morey | Dec. 8, 1959 |
| 2,923,856 | Greenne et al. | Feb. 2, 1960 |
| 2,928,994 | Widakowich | Mar. 15, 1960 |